Dec. 10, 1968  N. BIE, JR  3,415,721
KATABATIC WATER PURIFICATION APPARATUS
Filed July 6, 1966
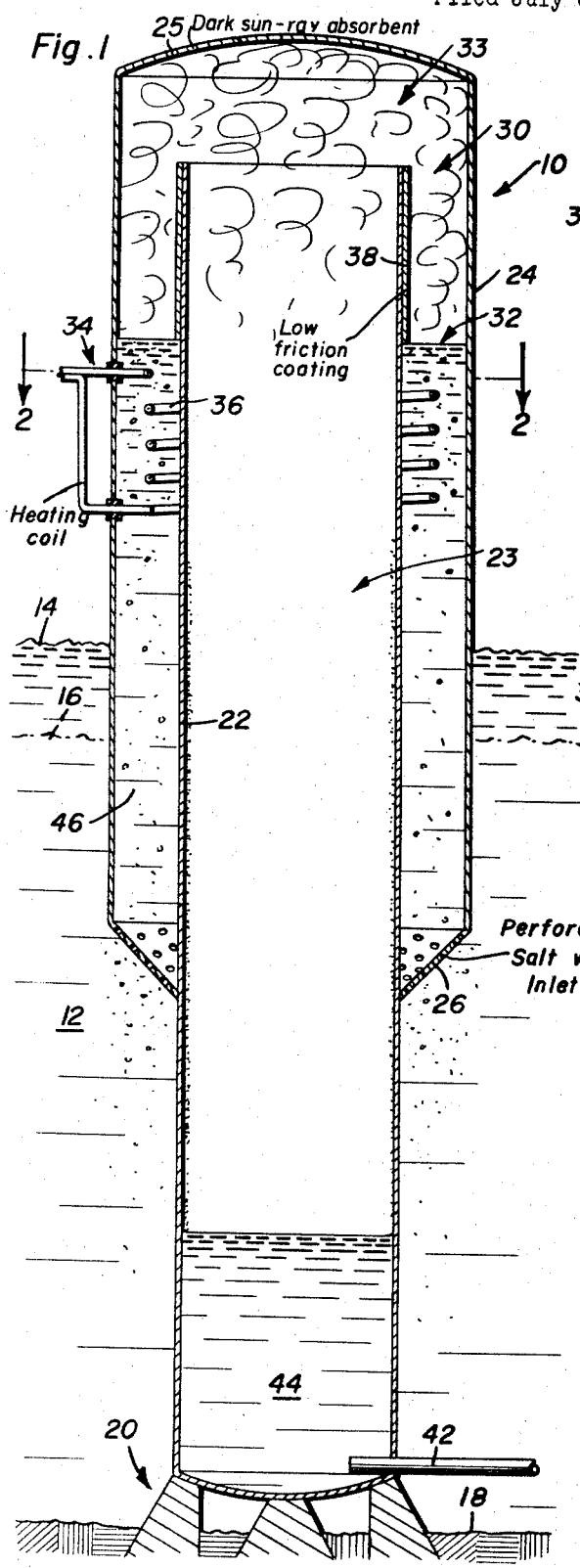
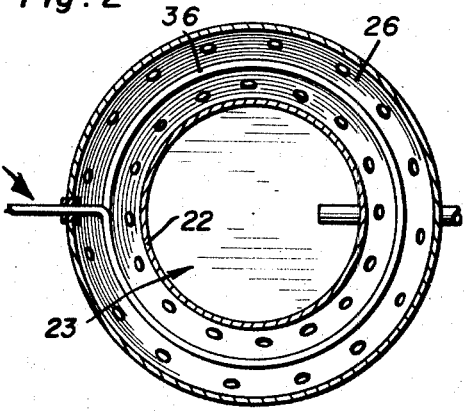
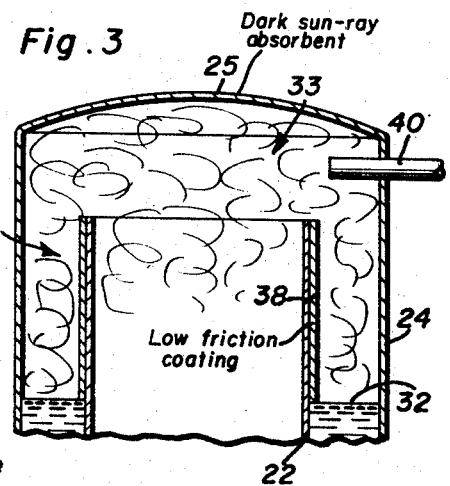
Norman Bie, Jr.
INVENTOR.

United States Patent Office 3,415,721
Patented Dec. 10, 1968

3,415,721
KATABATIC WATER PURIFICATION
APPARATUS
Norman Bie, Jr., 301 Pierce St.,
Clearwater, Fla. 33516
Filed July 6, 1966, Ser. No. 563,101
6 Claims. (Cl. 202—187)

ABSTRACT OF THE DISCLOSURE

A distillation apparatus situated within and in heat exchange relationship with a body of contaminated water to be purified and including an elongated vertically disposed cylindrical member partially submerged in the body of water to be purified and including an open top and a closed bottom wall which comprises a condensation chamber means. The upper portion of the condensation chamber means is surrounded by an evaporation chamber means concentrically disposed with respect thereto, and extending above the top of the condensation chamber means, and including an imperforate top wall and a perforate bottom section through which contaminated water to be purified is introduced. A heating coil mounted within the evaporation chamber means, below the top of the condensation chamber means, volatilizes contaminated water entering the evaporating chamber and the resultant water vapor is carried over into the condensation chamber by the katabatic effect of convention currents established by the heat exchange characteristics of the lower portion of the condensing chamber means being immersed within the body of contaminated water being purified.

This invention relates to a method and apparatus for the purification of water and more particularly to a distillation apparatus adapted to be situated within a body of water from which water to be purified is to be drawn which body of water is preferably subjected to tidal influences so as to assist in the distillation of the raw water. More specifically, the present invention relates to a distillation apparatus and method particularly suited for the purification of saline water.

Numerous methods and apparatuses have been proposed heretofore for the purification of water and particularly saline water in view of the fact that the per capita supply of potable as well as relatively pure agricultural and industrial water is rapidly declining as a result of not only the world's population explosion but the demands of modern agricultural and industrial processing procedures particularly when considered in the light of problems resulting from the pollution of our already limited potable water supplies.

While the devices and methods proposed heretofore are generally all capable of producing potable water from saline or otherwise contaminated water as a general rule by virtue of their complexity or inefficiency they are not susceptible to the production of large quantities of potable water in an economical manner.

Accordingly, it is an object of the present invention to provide a water purification apparatus adapted to be operatively positioned within a body of raw water from which water to be purified is directly drawn whereby the distillation of the raw water is greatly facilitated by katabatic airflow created by the relative cooling effect of the body of water within which the apparatus is positioned.

Another object of the present invention is to provide a water purification apparatus adapted to be rigidly secured to the bed underlying a body of water from which water to be purified is drawn whereby at least a portion of the apparatus, and preferably the portion comprising the condensing means, is in intimate heat-exchange relationship with the body of water within which it is placed and the apparatus extends a substantial distance above the normal high water level, preferably of a body of water subjected to tidal effects, whereby the tremendous energy inherent in the rise and fall of the water level of the body of water may be advantageously utilized to improve the over-all efficiency of operation of the apparatus.

A further object of the present invention is to provide a novel method for the purification of water wherein the rise and fall of tidal waters may be advantageously utilized to assist in the distillation of, and consequently purification of, raw nonpotable water.

Still another object of the present invention is to provide a water purification apparatus comprising a pair of telescopically received concentrically disposed cylindrical members which cooperate to define an inner condensation chamber supported from the bed of a body of water, in intimate heat exchange relation thereto, while extending upwardly a sufficient distance so as to derive benefit from the tidal effects upon the body of water within which it is situated and wherein the apparatus further includes an outwardly disposed concentric downwardly opening cylindrical member rigidly secured to the condensation chamber in a manner so as to effectively provide a generally annular evaporation chamber in direct communication with the condensation chamber whereby water to be purified enters the annular evaporation chamber where it is acted upon by suitable heating means to volatilize the water which water vapor is drawn into and condensed against the relatively cool walls of the condensation chamber by a katabatic effect assisted by an intermittent partial pressure created both by the tidal variations and effect of purified water being withdrawn from the condensing chamber.

Still a further object of the present invention is the provision of a water purification apparatus of the general nature disclosed wherein there is provided a means of exhausting entrained air entering the apparatus along with the raw water to be purified.

A still further object of the present invention is to provide a water purification apparatus of the general nature described wherein at least a portion of the evaporation chamber normally not covered by raw water being volatilized is provided with a polymeric coating so as to retard the deposition of salts thereon.

Still a further object of the present invention is to provide a water purification apparatus of the general nature described wherein an upwardly opening and vertically extending condensation chamber means extends a substantial distance above the high water level mark of a body of water within which it is situated and a downwardly opening concentric outwardly disposed evaporation chamber means secured to the condensation chamber means, in telescopic relation thereto, extends downwardly a substantial distance below the low water mark normally occurring in the body of water within which the apparatus is situated and wherein a heating means disposed in an annular chamber between the two cylindrical members is situated so as to be adjacent the upper portion of the water within the annular chamber.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a transverse vertical sectional view of an exemplary embodiment of a water purification apparatus constructed in accordance with the principles of the present invention further showing the apparatus operatively positioned within a body of water affected by tidal variations and showing the apparatus rigidly secured to the bed underlying the body of water and extending upwardly therefrom a substantial distance above the normal maximum high water level;

FIGURE 2 is a horizontal sectional view taken substantially along the plane of the line 2—2 of FIGURE 1; and FIGURE 3 is a fragmentary vertical sectional view of a modified form of the apparatus of FIGURE 1 wherein there is provided a means of exhausting non-condensable gases which enter the apparatus with the raw water to be purified.

Referring now to the exemplary embodiment of the apparatus illustrated in carrying forth the method of the present invention, it will be noted that the katabatic dewpond water purification apparatus indicated generally at 10 is illustrated as being operatively positioned within a body of water 12 such as an ocean, bay, etc., affected by tidal influences as indicated by the high and low water levels 14 and 16 respectively. As seen in FIGURE 1, the water purification, or distillation apparatus 10 is rigidly secured to the bed 18 underlying the body of water 12 by a support means indicated generally at 20 such as concrete pylons for example.

The distillation apparatus 10 includes a vertically disposed elongated upwardly opening cylindrical member 22 preferably formed of a rigid relatively good heat conductor such as of a relatively non-corrodible metal or alloy for example. As will become readily apparent hereinafter the upwardly opening cylindrical member 22 comprises a condensation chamber means wherein water vapor gives up a portion of its heat to the water being vaporized so as to initiate condensation which process is subsequently assisted by the agency of heat conduction through the walls of the cylindrical member 22 which are in direct heat exchange relationship with the relatively cool water 12. It will be understood that the cylindrical member 22 may be corrugated so as to increase the area of the heat exchange surface between the condensing chamber 23 and the water drawn into the annular evaporation chamber 30.

The distillation apparatus 10 further includes a concentrically disposed downwardly opening elongated cylindrical member 24 preferably formed of rigid heat conductive relatively non-corrodible material rigidly and concentrically secured with respect to the condensation chamber formed by the member 22 by means of an annular perforate water inlet 26, for example.

As seen best in FIGURE 1 the upwardly opening cylindrical member 22 extends from substantially beneath the average water level of the body of water 12 to substantially above the high water mark 14 thereof. Moreover, it will be seen that the downwardly opening cylindrical member 24 coacts with the cylindrical member 22 to define a generally annular evaporation chamber means indicated generally at 30 wherein impure water entering the apparatus 10 through the perforate inlet 26 rises to a level indicated generally at 32, in a manner to be described in detail hereinafter. The water is heated by the action of solar heat absorbed upon and transmitted through the imperforate top wall 25 of the cylindrical member 24, which is preferably painted or otherwise coated with a relatively dark, or black non-insulating substance so as to insure maximum absorption of solar energy, and the action of a heating means indicated generally at 34 provided with heating coils 36 disposed within the evaporation chamber 30 and positioned so as to normally be fully immersed in the water within the annular chamber 30 and preferably positioned so as to be adjacent the upper portion of the water therein. It will be understood of course that the heating means 34 need not necessarily comprise helically disposed electrical Calrod units such as 36 but could be heating coils of any suitable configuration including those wherein the source of heat is derived from a source other than electrical energy such as from steam, etc.

As seen best in FIGURES 1 and 3, adjacent the upper open end of the cylindrical member 22 there is provided a polymeric coating 38 such as of polytetrafluoroethylene, for example, so as to provide an extremely low friction surface to retard the crystallization of contaminants such as salt thereon. Moreover, in the embodiment of the invention illustrated in FIGURE 3 it will be noted that there is provided a suitable conduit 40 which sealingly passes through the wall of the member 24 and is in communication with the generally annular evaporation chamber 30 and is connected to a suitable source of vacuum, not shown, so as to provide a means of withdrawing non-condensible gases, such as air for example, which enter the evaporation chamber 30 by virtue of their being entrained in the impure water entering the apparatus 10.

Referring again to FIGURE 1 it will be further noted that adjacent the lower portion of the cylindrical member 22 there is provided a distilled water outlet conduit 42 which sealingly passes through the wall thereof and is positioned so as to be adapted to permit withdrawal of condensed pure water 44 by means of a suitable pump, not shown.

In operation, the entire device 10 is first filled with fresh water such as by means of a reverse flow through the discharge conduit 42 so as to completely flood the interior of both the condensing chamber 23 and the evaporating chamber 30 in order to drive out all the non-condensible gases. It will be understood of course that this is only necessary when utilizing the embodiment of the apparatus illustrated in FIGURE 1 inasmuch as when the alternative construction shown in FIGURE 3 is utilized the non-condensible gases may be withdrawn from the device 10 by means of the vacuum conduit 40. The fresh water is then withdrawn from the device through the conduit 42 thus drawing impure water, i.e. salt water for example, into the annular evaporation chamber 30. The evacuation of the chamber 23 through the conduit 42 progresses until a partial pressure of a predetermined magnitude is reached, which pressure coincides to that necessary to raise the water level in the annular chamber 30 above the heating coils 36 of the heating means 34 but below the upper limit of the cylindrical member 22 so as to avoid an overflow of the impure water into the condensing chamber 23.

Thereafter, continued pumping out of the pure water 44 subsequently produced creates a partial pressure in the condensing chamber 23, which when low enough in relation to the temperature of the water being evaporated, causes the water molecules to evaporate into the chamber 30 and pass downwardly in a katabatic manner described in further detail hereinafter through the condensing chamber 23 so as to be collected in the form of condensation or pure water 44. Toward this end, through the combined agencies of solar heat acting upon the top 25 and upper portions of the side walls of the cylindrical member 24 as well as the heat input into the heating means 34 and the latent heat of vaporization liberated by the condensation of moisture upon the chamber wall, water from the upper portion of that reposing in the annular chamber 30 volatilizes from the upper surface 32 thereof and is drawn downwardly in a katabatic manner, i.e. the downflow of the water vapor is effected by a convection flow set up by a temperature differential between the upper portion of the evaporation chamber 30 and the lower portion of the condensing chamber 23 which is being progressively cooled by virtue of its heat exchange relationship with the water in the lower portion of the annular chamber 30 and the direct heat exchange relationship of the water 12 contiguous with the lower portion of the cylindrical member 22. Accordingly, the invisible water vapor schematically indicated at 33 condenses upon the walls of the chamber 23 and descends to collect as a "dewpond" or reservoir 44 of pure water. Although I do not wish to be limited to this analysis it will be appreciated from the foregoing that there is apparently a cyclical build-up of pressure within the unit as water is vaporized and a subsequent reduction of pressure as water is condensed out and withdrawn through the conduit 42. Furthermore, with changes in the level of the water 12 between the high tide mark 14 and the low tide mark 16, that is to say when the tide goes out and approaches the low water mark 16 the water level 32 in the annular chamber 30 recedes thus lowering the partial pressure in the chambers 30 and 23 so as to effectively reduce the heat input necessary to volatilize the water at the reduced pressure. Accordingly, it will be appreciated that the device 10 of the present invention utilizes the tidal motion of the water 12 to enhance the distillation of the impure water.

As seen in FIGURE 1 the contaminants such as salt for example which precipitate out of the water in the form of crystals 46 by virtue of saturation of the solution pass downwardly through the water in the annular chamber 30 and are assisted in being flushed therefrom by virtue of the rise and fall of the water 12 in response to tidal influences, thus eliminating the need for any mechanical means of removing the precipitated contaminants.

From the foregoing it will be readily apparent that in the distillation apparatus 10 the impure water within the annular chamber 30 to be evaporated is raised a considerable distance above the level of the water surrounding the device and the saturated vapor 33 within the upper portion of the condensing chamber 23 is condensed upon the inner walls of the member 22 adjacent to the pure water within the annular chamber 30, thus the heat liberated by the condensation is exchanged to the water rising upwardly in the annular chamber 30 to be evaporated at the interface 32 thus creating a heat exchange condition which returns a substantial portion of the heat present in the water vapor to the system. Moreover, the projection of the lower portion of the condensing chamber 23 substantially below the tidal level 16 and the impure water inlet 26 provides a significant additional cooling and condensing surface for the condensed water 44 running down the inner walls of the condensing chamber 23 whereby substantial amounts of heat present in the condensed water 44 can be further removed by conduction thereof to the surrounding water which it will be appreciated is not only substantially cooler than the water within the annular chamber 30 but is also somewhat colder than the water adjacent the surface of the body of water 12.

With reference to the thermal requirements of the distillation apparatus 10 it is considered that a thermal differential of no more than 10° F. will cause the system to operate satisfactorily, whereas thermal differentials as high as 50° F. are easily forseeable comparing the water temperature at 30 or more feet below the ocean surface for example to the temperature of that portion of the system exposed to solar radiation and/or additional heat input through the heating means 34.

It will therefore be appreciated from the foregoing discussion of the apparatus 10 and the method of operation thereof that the several objects of the present invention have been satisfied in a manner which provides for the economical purification of both saline and contaminated non-saline waters.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A distillation apparatus adapted to be situated within and in heat exchange relationship with a body of contaminated water from which water to be purified is to be drawn comprising an evaporation chamber means and a condensation chamber means, said condensation chamber means comprising an inner elongated vertically disposed cylindrical member adapted to be partially submerged in said body of water and having an open top and a generally imperforate bottom wall, said evaporation chamber means comprising an elongated cylindrical member secured outwardly and concentrically of said condensation chamber in telescopic relation thereto and having a perforate bottom section through which contaminated water to be purified is introduced and precipitate contaminates pass downwardly therethrough and a generally imperforate top wall, the top of said outer member being spaced from the top of said inner member, whereby an annular evaporating chamber formed between said members is in communication with the condensation chamber, heating means comprising a heater coil disposed within said annular evaporating chamber and positioned adjacent the upper portion thereof so as to be fully immersed in the upper portion of the contaminated water within the chamber whereby contaminated water entering said evaporating chamber is heated and volatilized and the resultant water vapor being carried over into said condensation chamber by the katabatic effect of convection currents, set up by the heat exchange characteristics of the condensing chamber, means adapted to withdraw condensed water from the apparatus to a point of use, and said apparatus being of sufficient length to extend from a point substantially below the surface of the body of water within which it is situated to a point substantially above the surface of the body of water.

2. The combination of claim 1 including a means of exhausting non-condensible gases from said condensation chamber, said exhausting means comprising a conduit operatively connected to the interior of the condensation chamber and a suitable source of vacuum.

3. The combination of claim 1 including a raw water inlet filter means comprising an annular perforate member bridging the annular space between and secured adjacent the end of the outer member and the inner cylindrical member.

4. The combination of claim 1 wherein the upper portion of the exterior of the inner member is coated with polytetrafluoroethylene whereby the tendency for precipitates to form thereon is substantially reduced.

5. The combination of claim 1 wherein the body of water is subjected to tidal effects.

6. The combination of claim 1 wherein said condensation chamber means is formed of a heat conductive material and is adapted to conduct latent heat of vaporization liberated by the condensation of vapor through the wall of said condensation chamber means to assist in heating the raw water being drawn into the apparatus.

References Cited

UNITED STATES PATENTS

| 1,544,029 | 6/1925 | Nelson | 202—234 X |
| 1,666,777 | 4/1928 | Forbes | 159—13 X |
| 1,966,938 | 7/1934 | Stone | 203—10 |
| 2,006,985 | 7/1935 | Claude et al. | 202—234 X |
| 2,490,659 | 12/1949 | Snyder | 202—205 |
| 2,616,839 | 11/1952 | Ames | 202—234 X |
| 2,716,446 | 8/1955 | Ross | 203—10 X |
| 2,820,744 | 1/1958 | Lighter | 202—234 |

FOREIGN PATENTS

| 1,357,055 | 2/1963 | France. |
| 442,449 | 8/1912 | France. |

NORMAN YUDKOFF, *Primary Examiner.*

FOLSOM E. DRUMMOND, *Assistant Examiner.*

U.S. Cl. X.R.

203—11; 202—190, 235